Oct. 4, 1960 E. DAVIS 2,954,873
BLOCK-OFF PLATE FOR BACK WASH OPERATION
Filed Feb. 13, 1956 2 Sheets-Sheet 1

INVENTOR.
ERNEST DAVIS
BY
John P. Murphy
ATTORNEY

INVENTOR.
ERNEST DAVIS
BY
John P. Murphy
Attorney

United States Patent Office 2,954,873
Patented Oct. 4, 1960

2,954,873

BLOCK-OFF PLATE FOR BACK WASH OPERATION

Ernest Davis, Syracuse, N.Y., assignor, by mesne assignments, to Ward Industries Corporation, Syracuse, N.Y., a corporation of Delaware Filed Feb. 13, 1956, Ser. No. 565,057

5 Claims. (Cl. 210—333)

This invention relates to dry cleaning systems such as are used for dry cleaning wearing apparel, textile fabrics or the like, and in particular to a cut-off plate used with respect to the filters during the back wash operation.

In the dry cleaning system, as is known to those familiar with the art, periodically it is the practice to filter the cleaning solvent so as to remove such solids as may be entrained therein. As seen in various conventional cleaning systems, a filter using tubes applied with a filter coating is used for this operation. As the solvent passes through the filter means, foreign particles from the cleaning solvent are collected in the filter, removing them from the solvent. As this suspended matter trapped therein increases to such a point that it is no longer economical to continue the filtering operation, by the reverse action of the pump, this sludge is dislodged from the filter means by what is known as back washing.

As is now being practiced, the reverse action of the pump forces the solvent back through the filter into the sub filter in order to dislodge the caked-up gunk from the filter means. If this were not done, the continuous collection of this gunk would subsequently build up and tend to become more firmly cemented in the filter means until the porosity of the filter coating would become seriously impaired. This would result in a much lower efficiency of the filtering apparatus.

Therefore, means have been devised whereby the reverse flow of the liquid at a substantially higher velocity than that employed during the filtering operation through the filtering means, remove the bed of entrained matter from the filter tubes. A considerable time period is involved in this method inasmuch as the length of the flow of the back wash does not necessarily dislodge the entire caked-up gunk from the filter tubes. As is commonly known, the flow of the back wash takes the path of least resistance, so that it flows through the area where the filter cake has partially worn off, omitting the dirtiest tubes. As a result, the pressure of the flow in back washing is dissipated, that is, it is lost through the tubes that are clean and fails to clean the remaining tubes. Therefore, this means of back washing is not thoroughly effective.

It is an object of the present invention to restrict the flow of the back wash so that a limited amount of tubes are back washed at one time, receiving the full pressure of the flow and enabling a more concentrated force, resulting in a higher degree of efficiency relative to dislodging the muck, sludge and the cake formed on the filter tubes.

It is another object of this present invention to reduce the greater flow of the back wash into the sub filter. In this manner, the flow of the liquid results in a more thorough cleaning than if the sub filter received all of the flow simultaneously.

Another advantage of this novel device is that it may be manually operated, so that the restriction of the flow may be concentrated on the filter tubes as desired by the operator.

Still another object of this invention is that it may be installed on either a square type or circular filter, as are now in use, without engaging in any changes in the procedure of the operation of the dry cleaning apparatus.

In accordance with the present invention, during the back wash operation in a conventional dry cleaning system, a block-off plate is used. This block-off plate is located at the top of the filter above the filter tubes located therein. In the case of a circular filter, a round disc plate having a segmented opening, is used. This cut out disc plate is rotated manually by means of a knob located on a piston. This piston is connected to the disc plate. A stilt lever located on the piston below the knob acts as a support to rest on a seat of the cover during the filtering operation when the disc plate is not in use, holding the disc plate up and allowing the free flow of the solvent through the filter tubes. After the filtering operation, the stilt lever is raised from the seat of the cover allowing the piston to drop the disc plate down in position over the filter tubes, blocking off all the tubes except those exposed through the cut out opening of the disc plate. The reverse action of the pump begins the back wash flow through the filter tubes. This flow, is therefore blocked off from the tubes covered by the plate and concentrated on the filter tubes located in position at the cut out opening of the disc plate. After this limited number of filter tubes is subjected to the back wash flow for a desired time and have been cleaned, the operator then, by means of the knob and piston, rotates the disc plate to the next position, exposing another set of a limited number of filter tubes to the back wash flow. In this manner, the complete bank of filter tubes is exposed to the concentrated flow of the back wash through the cut out opening in the disc plate at one complete rotation of the disc plate. After the filter tubes have been thoroughly cleaned by the back wash, the operator then raises the disc plate and places the stilt lever to rest on the seat of the cover. This holds the disc plate up, away from the filter tubes, and allows the normal flow of the solvent through the filter tubes, through an outlet in the conventional manner.

In a square type filter arrangement having filter tubes, the block-off plate is sectionally divided as desired, each section having a separate lever means for raising and lowering the block-off plate into position as desired by the operator.

Further objects and advantages will become more apparent from the following detailed description of a preferred embodiment thereof which is illustrated in the accompanying drawings, in which.

Figure 1:
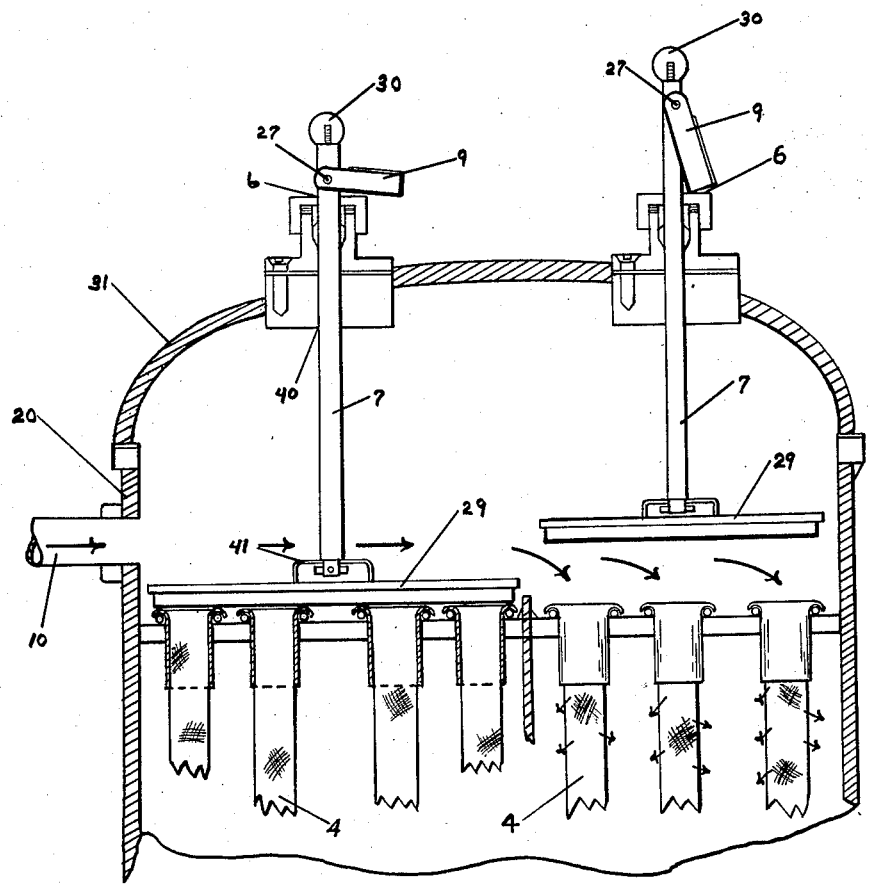
Figure 1 is a cross section view of the block-off plates in relative position with respect to the filter tubes located in a rectangular-shaped filter, illustrating the lever means used therewith.

With reference now made to the drawings, and specifically to Figure 1, a rectangular filter casing 20 is shown having a cover 31 and filter tubes 4 located therein. These filter tubes 4 are supported therein by filter supports 42, or any other such suitable arrangement. Affixed to the cover 31 is a seat arrangement 6 through which passes piston 7 through the opening 40. A block-off plate 29 is connected to the piston 7 by any suitable means, represented by the reference character 41. Affixed to the opposite end of the piston 7 is a knob 30. Any other such handle means may be used. A stilt lever 9 is pivotly mounted on the piston 7 by a pin 27, so that when the block-off plate 29 is in a raised position, the stilt lever 9 rests in a perpendicular-like position on the seat arrangement 6, holding the block-off plate 29 up, away from the filter tubes 4. When it is desired to lower the block-off plate 29, the stilt lever 9 is removed from the seat arrangement 6 and placed horizontally, allowing the piston 7 to drop down through the opening 40 in the seat arrangement 6, thus lowering the block-off plate 29 and covering the area of the limited filter tubes 4 relative to the size of the block-off plate 29.

During the filtering operation when it is desired to have the solvent pass through all of the filter tubes 4, out through the outlet 10, as is the normal practice, all of the block-off plates 29 are in a raised position, that is, the stilt levers 9 rest on the seat arrangements 6 holding the block-off plates 29 up, away from the filter tubes 4. Thus, the flow of the solvent during the filtering operation is not obstructed in any way.

After the filtering operation has been completed, the operator lowers all, but one, of the block-off plates 29. Thus, only a limited number of filter tubes 4 are exposed at one time. By the reverse action of the pump (not shown), the back wash operation begins. As illustrated in Figure 1, the back wash flow entering outlet 10 is fully concentrated on the filter tubes 4 exposed by the block-off plate 29 which is in a raised position. Therefore, these filter tubes 4 are thoroughly cleaned by the concentrated flow of the back wash. After a period of time, according to need, the raised block-off plate 29 is lowered by removing the stilt lever 9 from its perpendicular-like position on the seat arrangement 6 which allows the piston 7 to drop through the opening 40. After this has been completed, the operator raises a second block-off plate 29 and exposes a second set of filter tubes 4 to be exposed to the concentrated flow of the back wash. In this manner, all of the filter tubes 4 in the filter casing 20 are cleaned by the concentrated flow of the back wash which is controlled with respect to direction and also limited to the filter tubes 4 by means of the block-off plates 29.

When the back wash operation is completed, and all of the muck, sludge, etc., has been dislodged from the filter tubes 4, the operator raises all of the block-off plates 29 which are held away from the filter tubes 4 by placing the stilt levers 9 to rest perpendicularly on the seat arrangements 6. Thus, it is seen that the normal filtering operation may proceed without any further action, and that the concentrated flow of the back wash is easily forwarded to the sub-filter for further processing.

Figure 4:
Figure 4 is a top plan view of a rectangular-shaped filter illustrating the division of the area into sections to be used with block-off plates.

Figure 4 illustrates the division of a rectangular filter casing 20 into sections represented by the reference characters 21, 22, 23, and 24 being open, exposing a limited number of filter tubes 4 to the back wash flow. Each section has its own block-off plate 29 having a piston 7, stilt lever 9 and seat arrangement 6 relative to the block-off plate 29 connected therewith. The division of the rectangular filter casing 20 with respect to the area covered by the block-off plates 29 is not to be limited to the size as shown in Figure 4, but may vary according to need.

Figure 2:
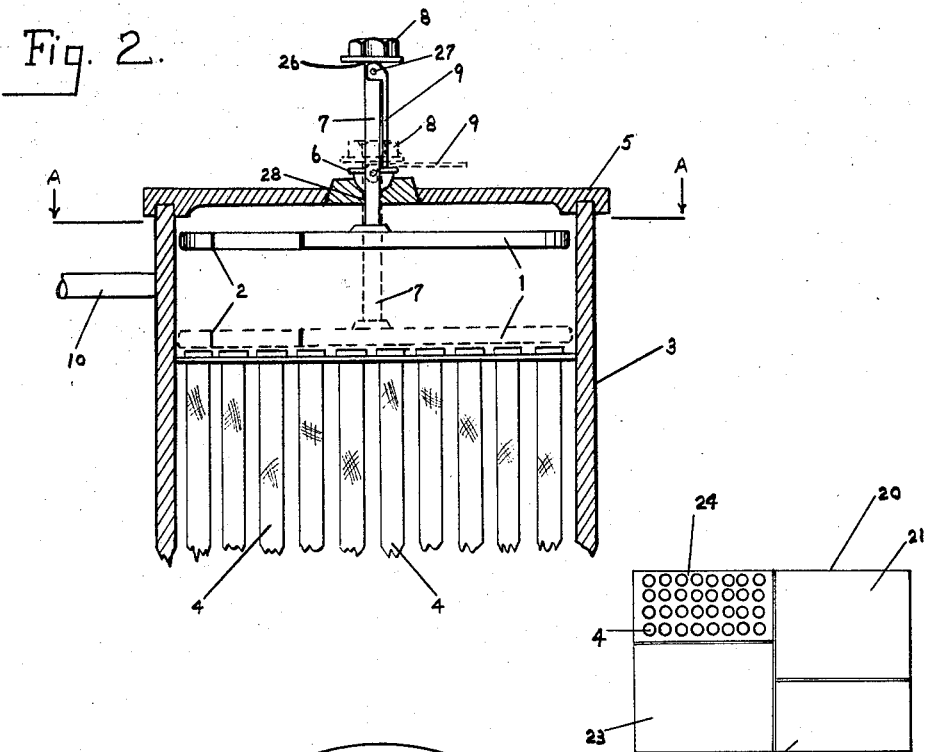
Figure 2 is a cross section view of a conventional circular filter having filter tubes located therein, and illustrating the position of the cut out opening in a disc plate with respect to the filter tubes.
Figure 3:
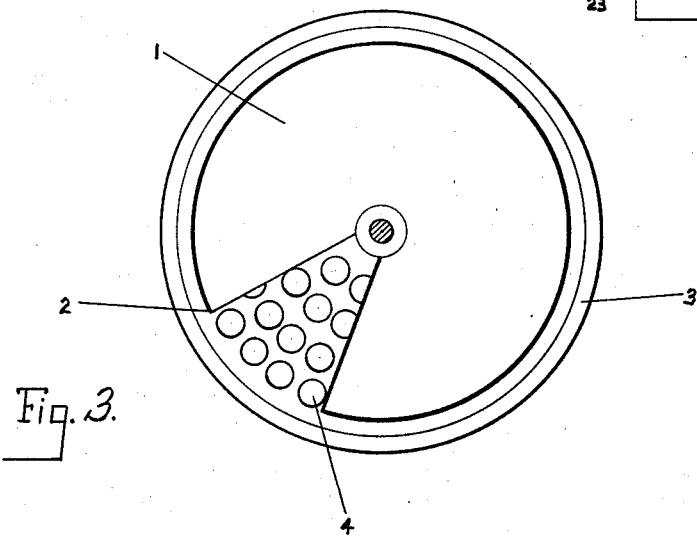
Figure 3 is a top plan view of the disc plate having a cut out opening illustrated with respect to the exposed filter tubes.

Referring further to the drawings and specifically to Figures 2 and 3, a circular filter casing is represented by the reference character 3 and has filter tubes 4 located therein. Affixed to the cover 5 of the circular filter casing 3 is a seat arrangement 6 having an opening 28. Located within the filter casing 3 is a disc plate 1 having a cut out opening 2; the disc plate 1 is connected to a piston 7, by suitable means, which passes through the seat arrangement 6 and to which opposite end is connected a fitting 8 adapted for a ratchet wrench. This fitting 8 is illustrated in Figure 2 and shown connected at the point 26 on the piston 7. A stilt lever 9 is attached to the piston 7 below the fitting 8 by a pin 27 or other such suitable means. An outlet 10, found in the conventional filtering system is also illustrated in the drawing.

After the normal operation of the flow of the solvent through the filter tubes 4, the operator lifts the stilt lever 7 from the perpendicular position on the seat arrangement 6, and places it in a horizontal position with respect to the seat arrangement 6, so that the piston 7 connected to the disc plate 1 is allowed to drop through the opening 28. This lowers the disc plate 1 directly in place over the filter tubes 4. By the reverse action of the pump, the solvent is forced into the filter casing 3 through the outlet 10 and through the filter tubes 4 exposed by the cut out opening 2 located in the disc plate 1. The pressure of this back wash flow is so concentrated that it removes all of the sludge from the exposed filter tubes 4. The number of tubes 4 exposed in this manner is dependent upon the size of the cut out opening 2 in the disc plate 1. Figure 3 clearly illustrates the position of the exposed filter tubes 4 with respect to the cut out opening 2. Thus, pressure of the back wash flow is concentrated on a limited number of filter tubes 4 exposed by the cut out opening 2; the cut out opening 2 being the only outlet for the flow. In this manner, the exposed filter tubes 4 are thoroughly cleaned and the dislodged caked-matter located thereon is passed into the sub-filter with the flow of the back wash.

After the first limited number of filter tubes 4 has been cleaned in this way, the operator then turns the fitting 8 using a ratchet wrench, and positions the cut out opening 2 located in the disc plate 1 over another set of limited filter tubes 4, thereby exposing this second set of filter tubes 4 to the concentrated flow of the back wash. As the disc plate 1 is rotated in this manner, the entire bank of filter tubes 4 is cleaned in one complete rotation of the disc plate 1.

After the filter tubes 4 have been completely cleaned, the operator lifts the disc plate 1 and places the stilt lever 9 to rest perpendicularly on the seat arrangement 6, as illustrated in Figure 2. When the disc plate 1 is raised and held in this manner, the normal run of the filtering operation may be resumed.

From the foregoing description, it is apparent that the invention accomplishes its objects and that an apparatus is provided whereby the efficiency of the dry cleaning system is improved. It is apparent that many modifications of the apparatus hereinbefore described and illustrated in the accompanying drawings will present themselves to those skilled in the art without departing from the spirit of the invention. For example, the size of the block-off plate is not to be limited as illustrated in the drawings, but may vary in size according to need. Likewise, the size of the cut out opening in the disc plate is not to be limited to the size as illustrated in the Figures 2 and 3. Therefore, it is to be distinctly understood that the invention is not to be limited to the specific details described for the purpose of illustration, but that such modifications and the use of such individual features as do not depart from the spirit of the invention are, although not specifically described herein, contemplated by and within the scope of the appended claims.

I claim:

1. In a dry cleaning system having a plurality of filters wherein said filters are cleaned by a reverse flow of solvent under pressure through said filters, a back wash block-off plate for restricting the reverse flow of solvent through a selected number of said filters so as to concentrate the pressure of said reverse flow of solvent on a limited number of said filters and for preventing the flow of solvent through the filters having the least resistance to said reverse flow of solvent under pressure, said back wash block-off plate comprising a disc plate, a cut out opening formed in said disc plate, said cut out opening varying in size, said disc plate forming means for directing the flow of the back wash flow through the filter tubes exposed by said cut out opening, a piston connected to said disc plate for rotating said disc plate in position with respect to said filter tubes, a handle and piston means for raising and lowering said disc plate with respect to said filter tubes, a lever connected to said piston by suitable means, said lever forming means for retaining said disc plate in position with respect to the filter tubes, and a seat located on a cover of the filter casing, said seat forming means for holding said lever.

2. A block-off plate for restricting the flow of solvent during the back wash operation in a dry cleaning machine through a limited number of filter tubes, said block-off plate comprising a plate having an opening therein, and a lever arrangement connected thereto for lowering and raising said plate in position with respect to said filter tubes.

3. In a dry cleaning system having a filter including a plurality of filter tubes; a block-off plate for the back wash operation comprising a round disc plate and a segmented opening therein, said plate being located in the top of a filter above the filter tubes therein, a piston connected to said plate, said piston passing through a seat on the cover of the filter, means on said piston for rotating said piston and said plate, and a lever on said piston for lowering said plate to cover a limited number of filter tubes in said filter.

4. In a dry cleaning system having a plurality of filters wherein the filters are cleaned by a reverse flow of solvent under pressure through said filters; a back wash block-off plate for restricting the reverse flow of solvent through a limited number of said filters so as to concentrate the pressure of the reverse flow on a limited number of said filters, said block-off plate comprising a disc plate and a segmented opening formed therein, said plate being located in the top of a filter above the filter tubes and forming means for directing the back wash flow through the filter tubes exposed by said segmented opening, a piston connected to said disc plate for rotating said disc plate with respect to said filter tubes and forming means for raising and lowering said plate with respect to said filter tubes, and a lever on said piston forming means for retaining said disc plate in position with respect to said filter tubes.

5. In a dry cleaning system having a filter including a plurality of filter tubes; a block-off plate for the back wash operation comprising a disc plate and an opening formed therein, said plate being located in a filter at one end of the filter tubes therein, means conected to said plate for causing said plate to be positioned for covering a selected number of filter tubes, and means connected to said plate for rotating said plate.

References Cited in the file of this patent

UNITED STATES PATENTS

| | | |
|---|---|---|
| 203,565 | Stead | May 14, 1878 |
| 1,016,382 | Weeden | Feb. 6, 1912 |
| 1,276,482 | Bowen | Aug. 20, 1918 |
| 1,812,773 | Cannon | June 30, 1931 |
| 2,068,468 | Phillips | Jan. 19, 1937 |
| 2,310,587 | MacNeill | Feb. 9, 1943 |
| 2,441,526 | Zollinger | May 11, 1948 |